United States Patent
Brzeski

(10) Patent No.: US 12,246,495 B2
(45) Date of Patent: Mar. 11, 2025

(54) MACHINE AND METHOD FOR PRODUCING STRIPS FROM FIBER-REINFORCED PLASTIC COMPOSITE MATERIALS

(71) Applicant: Markus Brzeski, Weilerbach (DE)

(72) Inventor: Markus Brzeski, Weilerbach (DE)

( * ) Notice: Subject to any disclaimer, the term of this patent is extended or adjusted under 35 U.S.C. 154(b) by 390 days.

(21) Appl. No.: 17/639,764

(22) PCT Filed: Sep. 11, 2020

(86) PCT No.: PCT/DE2020/100795
§ 371 (c)(1),
(2) Date: Mar. 2, 2022

(87) PCT Pub. No.: WO2021/047739
PCT Pub. Date: Mar. 18, 2021

(65) Prior Publication Data
US 2022/0297397 A1 Sep. 22, 2022

(30) Foreign Application Priority Data

Sep. 12, 2019 (DE) .................... 20 2019 105 047.0

(51) Int. Cl.
*B29C 70/52* (2006.01)
*B29B 15/12* (2006.01)
*B29L 7/00* (2006.01)

(52) U.S. Cl.
CPC .......... *B29C 70/521* (2013.01); *B29B 15/122* (2013.01); *B29C 70/528* (2013.01); *B29L 2007/007* (2013.01)

(58) Field of Classification Search
CPC .............................. B29C 70/521; B29C 70/20
(Continued)

(56) References Cited

U.S. PATENT DOCUMENTS 6,251,206 B1   6/2001   Saito et al.
7,571,524 B2 *  8/2009   Kawabe .................... D02J 1/18
                                         28/282

(Continued)

FOREIGN PATENT DOCUMENTS

CN   108248074 A   7/2018
EP   3 192 644 A1  7/2017
EP   3 498 446 A1  6/2019

OTHER PUBLICATIONS

Tashiro, N., et al., "English machine translation by Clarivate Analytics of WO-2016039081-A1, with full WO patent application included.", B29C70/52, Aug. 17, 2015. (Year: 2015).*

(Continued)

*Primary Examiner* — S. Behrooz Ghorishi
*Assistant Examiner* — Gregory C. Grosso
(74) *Attorney, Agent, or Firm* — Collard & Roe, P.C.

(57) ABSTRACT

A machine and a method produce strips from a fiber-reinforced plastics composite material. The machine includes a housing through which fibers pass and in which profiled bars are fixedly or rotatably mounted, which are oriented perpendicularly to the passing direction of the fibers and by which forces can be applied alternately to the top and bottom of the fibers and to their coating with a plastics material in order to impregnate the fibers and to consolidate the plastics material between the fibers. The ratio of the average total contact length of all the profiled bars used in the impregnation in millimeters to the number of profiled bars is between 2:1 and 1:400, preferably between 1 and 1:200 and particularly preferably between 1:10 and 1:100.

16 Claims, 2 Drawing Sheets

(58) Field of Classification Search
USPC .......................................................... 156/166
See application file for complete search history.

(56) References Cited

U.S. PATENT DOCUMENTS

| 2003/0057585 A1* | 3/2003 | Tanaka ................... | D01D 11/02 |
| | | | 264/103 |
| 2010/0279114 A1* | 11/2010 | Tobisawa .............. | B29B 15/122 |
| | | | 428/378 |
| 2017/0056919 A1 | 3/2017 | Orisaka et al. | |

OTHER PUBLICATIONS

English translation of International Preliminary Report on Patentability in PCT/DE2020/100795, dated Nov. 18, 2021.
International Search Report in PCT/DE2020/100795, mailed Nov. 23, 2020.

* cited by examiner

MACHINE AND METHOD FOR PRODUCING STRIPS FROM FIBER-REINFORCED PLASTIC COMPOSITE MATERIALS

CROSS REFERENCE TO RELATED APPLICATIONS

This application is the National Stage of PCT/DE2020/100795 filed on Sep. 11, 2020, which claims priority under 35 U.S.C. § 119 of German Application No. 20 2019 105 047.0 filed on Sep. 12, 2019, the disclosure of which is incorporated by reference. The international application under PCT article 21(2) was not published in English.

The invention relates to a machine and to a method for producing strips from a fibre-reinforced plastics composite material in an improved manner, comprising a housing through which pass and in which a plurality of profiled bars are fixedly or rotatably mounted, which are oriented perpendicularly to or vertically relative to the passing direction of the and by means of which forces can be applied alternately to the top and bottom of the and to their coating with a plastics material in order to impregnate the and to consolidate the plastics material between the fibres.

In the available prior art, EP 3 192 644 A1 describes a machine for producing fibre-reinforced plastics strips, in which the pass through a container containing liquid plastics material for impregnation. In this bath of plastics material, the fibre bundle wraps around a number of cylindrical rollers alternately by the top and then the bottom thereof.

As a drawback, the application acknowledges that only incomplete wetting is achieved thereby. Another drawback of this machine is that consolidation of the plastics material is not mentioned even once. There are therefore small blowholes, pores and other cavities in the plastics layer between the fibres.

In a disadvantageous manner, forces are not transferred between adjacent in the region of these cavities. The forces to be transmitted are instead concentrated on the region in which the are interconnected by plastics layers adhered in a planar manner, and as a result the load on these regions increases. The risk of fibre breakages close to the edges of the cavities thus increases.

The transmission of force from to by means of the plastics layer is, however, the fundamental basis for the relatively very high loading capacity of fibre-reinforced plastics strips. The lower the diameter of the and the greater the number thereof, the greater the loading capacity, with the same proportion of fibres. Because the boundary layer to be bonded as a whole between the and plastics material also becomes larger here, wetting the with plastics material in the most complete possible manner also becomes even more important.

EP 3 192 644 A1 mentions that, as the speed of the passing through increases, the impregnation thereof becomes poorer. An attempt is made to counteract this by increased pressure being exerted on the plastics layer in an adjustable nozzle. In a disadvantageous manner, however, the tensile load on the increases significantly as a result, meaning that some may break without this being noticed, and therefore a lower-quality strip is produced.

Against this background, the invention addresses the problem of preventing these drawbacks as far as possible and of developing a machine in which the impregnation of the with plastics material and the consolidation of the plastics layer is improved and, in particular, the maximum possible processing speed is increased.

As a solution to this problem, the invention teaches that the ratio of the average total contact length of all the profiled bars used in the impregnation in millimeters to the number of profiled bars is between 2:1 and 1:400, preferably between 1:1 and 1:200 and particularly preferably between 1:10 and 1:100, wherein the machine comprises at least 10 profiled bars.

Within the scope of the invention, it has been found that, with such a ratio of the average total contact length in millimetres, which is provided during the impregnation process between the coated and the profiled bars, to the number of profiled bars, excellent impregnation results are achieved. When determining the total contact length, only some of the profiled bars contacted by the coated during the impregnation are taken into account. In order to calculate the average total contact length, the value obtained is divided by the number of profiled bars involved in the impregnation process.

By the strip made of fibre-reinforced plastics composite material wrapping around the profiled bars, an even pressure is exerted on the plastics layer.

A preferred configuration of the invention consists in that the spacing between the profiled bars in both the vertical and horizontal direction is adjustable.

The position of one or more profiled bars can be changed within the housing when the machine has a break in operation. To do this, the profiled bars may e.g. be pivotally mounted on auxiliary rods. If the housing consists of two opposite side walls interconnected by a middle part, profiled bars can be movably fastened in slots in the side walls. It is also possible for the two side walls to consist of a plurality of supports that are adjustable relative to one another. In this way, a machine according to the invention can be adapted to a wider range of different types and designs of the fibre-reinforced strips. Here, the side walls may contain grid patterns, which indicate the different positions of the profiled bars depending on the configuration. When switching to a different fibre-reinforced plastics composite material strip, the changeover process can be made easier as a result.

It is expedient here for the spacing between the profiled bars in both the vertical and horizontal direction to assume a different value from one profiled bar to the next.

The wrap angle is determined by the spacing between the profiled bar and its two adjacent profiled bars. Therefore, in a simple embodiment, the optimal values for the spacings and thus for the wrap angles are taken into account even during construction of a machine according to the invention. The profiled bars are each mounted or fastened at a single, particular point within the housing of the machine. As a result, this design of the machine is made specific to certain dimensions, certain plastics materials, certain and a certain range for the proportion of to plastics material.

In this way, the frictional force on the strip can advantageously be reduced by the spacing of the profiled bars decreasing in the processing direction of the strip.

Another configuration of the invention consists in that, in some of the profiled bars, when viewed in cross section, the spacing between their outer faces and their fastening points on the housing or the rotational axis varies over the circumference.

The profiled bars therefore have a varying diameter over one revolution. As one embodiment, a cross section in the form of an ellipse, a polygon having rounded or sharp corners, or a circle having a rib placed thereon is mentioned.

Owing to this shape, when wrap around the profiled bars, not only is even pressure exerted on the plastics layer in each case, but at least one additional pressure pulse is also added within this path. Advantageously, the total average tensile load on the does not increase to the same degree, however, since the elasticity and inertia of the plastics layers in front of and behind the region of this force pulse restrict the pulse from propagating within the fibre-reinforced plastics composite.

Because this additional force is only present as a brief pulse, its effect is concentrated on a smaller region of the plastics layer. The gas bubbles still present at this point are therefore compressed and driven outwards. Bubbles adhering to the become detached and migrate into the plastics layer. The repeated application of pressure and further pressure peaks on the plastics layer drive the small cavities in the layer further outwards and they are ultimately released to the outside.

This advantageous effect can be further enhanced by small, concave troughs being made in the profile in the manner of a depression before and/or after the additional domed portions, which project outwards in a convex manner, on the outer surface of the profiled bars. These troughs briefly reduce the pressure acting on the plastics layer such that the whole layer expands outwards and therefore the outer edge of the cavities is moved further away from the next fibre. If the pressure rises again soon afterwards and increases in a pulsed manner beyond the average value, the change in pressure from the "trough" to the "peak" of the cross section of a profiled bar is even greater. The pressure pulse encounters a cavity of which the edge and therefore also the midpoint have previously already been moved away from the fibre by the brief suction. By means of the reversal in direction from suction to pressure, the bubbles move back a little at the start of the pressure pulse, but only over part of the path already covered towards the outside previously during the suction due to the inertia and high viscosity of the plastics material. The pressure peak then ensures that the movement is reversed again and the whole cavity moves further away from the beyond its distance from the already previously reached during the suction.

The above-described pulsing of the force acting on the plastics material is an effective part of the production process; however, a relatively very high force, in absolute terms, is also helpful for driving the bubbles of air and gas out of the viscous plastics material. Therefore, the invention prefers the diameter of at least one profiled bar to be smaller than that of the others, such that it exerts a relatively high force perpendicularly to the movement direction of the fibres.

Owing to the small diameter, the force exerted perpendicularly to the movement direction of the can be increased.

Another configuration of the machine consists in that at least one of the profiled bars has a smaller diameter than the others.

Owing to the smaller diameter of the profiled bars, a relatively high force is exerted perpendicularly to the movement direction of the fibres, meaning that bubbles can be driven out of the viscous plastics material.

Another parameter that is important for the quality of the strip is an even thickness. To do this, the viscous plastics material has to be even distributed over the width of the fibres. For this purpose, the invention proposes that the diameter of at least one profiled bar is greater than that of the others, meaning that the wetted with plastics material rest on the profiled bar over a longer path, such that small mounds or ribs on the plastics layer are pressed into the adjacent depressions and troughs.

In practice, even at production speeds of greater than 6 m/min up to 50 m/min and with a very high proportion of fibres, the principle of the invention is nevertheless able to reduce the proportion of pores, blowholes and other cavities in the cross section of the strip to typically 5%. A further reduction to just 1% can be achieved under certain boundary conditions.

The effects set out above are intensified when the wrap angle around the relevant profiled bar becomes greater, but then the maximum passage speed drops in the process. Greater or lower values for this angle are optimal depending on the proportion of in the plastics material, the viscosity of the plastics material, the thickness and width of the fibre-reinforced plastics composite material, the desired passage speed, and other parameters.

Another alternative for processing the fibre-reinforced plastics composite is two adjacent profiled bars, the spacing between which is less than the material thickness of the passing through and their coating with plastics material. This configuration is referred to as a calender. The two profiled bars arranged close to one another in this way press the plastics layer into the with a particularly high force. As a result, the are very effectively impregnated first and foremost, even with a very high proportion in the cross-sectional area of the strip.

The profiled bars may be arranged within the housing of the machine in the surrounding atmosphere. The liquid plastics material has then already been applied to the fibres, e.g. in a nozzle which surrounds the entire bundle. Alternatively, the are partially or completely immersed in a bath of liquid plastics material. In order for the plastics material to be sufficiently viscous during the processing by means of the individual profiled bars, the profiled bars need to be heated. Infrared or laser beams, flames, hot gas, hot steam or electrically heated resistors may be used to do this. In this case, the temperature of the heated profiled bars can decrease in the processing direction of the strip, in order to ensure gentle and controlled cooling of the plastics material.

In practice, thicknesses of the fibre-reinforced plastics composite of from 0.05 mm to 5 mm can be achieved. Thicknesses of from 0.1 mm to 2 mm are particularly beneficial. The width of the strip is typically in the range of approximately 12 mm. According to the principle of the invention, strips can also be produced which are only 2 mm wide, however. The width may be increased into ranges of 2000 mm, such that fibre-reinforced plastics webs can be produced.

The proportion of in cross section is typically no less than 15%. For even better resistance to tensile loads, it can be increased to approximately 85%.

It is an important finding for the principle of the invention that the positive effect of an individual profiled bar on driving the gas bubbles out of the plastics material and on the even distribution of the plastics material over all the can be increased by improving the profile design and optimising the wrap angle, in particular at higher speeds, but not to more than a certain extent. In order to still be able to reach the desired production speed, it was possible to demonstrate, using many test setups and producing machines, that the effect of a greater number of profiled bars accumulates overall. Therefore, as a rule, a machine according to the invention should be equipped with at least 5 profiled bars; however, with at least 20 profiled bars, significantly improved impregnation and consolidation of the fibre-reinforced plastics composite material can be achieved. For an even greater improvement with a simultaneous increase in the production speed, it is useful to increase the number of profiled bars to approximately 100, in particular if the proportion of is increased towards 85%, speeds of up to 50 m/min are intended to be reached, and the air bubbles only take up around 1% of the cross section. In a preferred configuration, the machine comprises at least 5, 10, 15, 20, 25, 30, 40, 50, 60, 70, 80 or 90 profiled bars.

By means of a machine according to the invention, thermoplastic or thermosetting plastics materials, such as polyolefins, polyamides, polyphenylene sulfide (PPS), polyether ether ketone (PEEK), polyether ketone ketone (PEKK), polyetherimide (PEI), polyoxymethylene (POM), or polyethylene terephthalate (PET), can be processed and worked.

LCP, aramid, polyamide, polyester, UHMWPE or other plastics fibres, or carbon or glass can be embedded and incorporated in these plastics materials.

Advantageously, the machine is designed such that, during the impregnation process, one or more profiled bars can be set into rotation continuously or discontinuously and in the direction of the movement or counter thereto.

By driving the profiled bars involved in the impregnation process, the friction can be reduced (by rotation in the running direction) or increased (by rotation counter to the running direction), meaning that the possible contact surface per driven profiled bar can be reduced/increased. If the profiled bars are driven in this way, this needs to be taken into account when calculating the average total contact length.

The machine is preferably designed such that one or more profiled bars can be set into vibration in order to assist the impregnation of the fibres.

The machine is preferably designed such that a plurality of strips can be produced thereon simultaneously beside one another or above one another.

Advantageously, the machine is designed such that the strips produced beside one another or above one another can be brought together in another consolidation unit to form a strip which is layered both vertically and horizontally.

Advantageously, the machine is designed such that the may be of one type or may be a combination of two or more different types of fibre.

The machine is preferably designed such that the plastics material used may be a mixture of different plastics materials and/or may be applied in layers.

Advantageously, the machine is designed such that the surface of the strip is coated after the impregnation, meaning that the strip has better protection against environmental influences or can be further processed in an improved manner.

The machine is preferably designed such that the profiled bars may be in the form of knives, doctor blades or scrapers, in order to improve the quality and properties of the strip.

Grooves or milled recesses, which are designed to shape the strip, are preferably made in the profiled bars.

Advantageously, the grooves have edges, which are either parallel or not parallel to one another.

The edges of a groove are preferably designed to be rounded, angled or protruding.

Advantageously, the grooves have side walls, wherein the side walls are designed so as to protrude perpendicularly or obliquely relative to the relevant profiled bar.

The grooves preferably have a different width.

Advantageously, the groove has a base. The base is domed in the same way as the profiled bar, has a different domed portion, or has a flat surface.

The problem is also solved by a method for producing strips from fibre-reinforced plastics composite materials using a machine according to the invention by additives being added to the plastics material used.

The machine is preferably designed such that additives can be added to the plastics material used, meaning that the properties of the strips produced in respect of the visual appearance and also chemical and physical properties are altered. The additives may also be used as adhesion promoters in the machine.

Lastly, according to the invention, further additives for protection or impregnation are applied to the fibre-reinforced plastics composite material during or after processing.

The fibre-reinforced plastics composite material can be sprayed with further additives for protection or impregnation during or after processing.

The additives are applied to the fibre-reinforced plastics composite material by being sprayed or smeared from a nozzle.

In the following, further details and features of the invention will be explained in greater detail with reference to an example. This is only intended to explain the invention, but not to restrict it. In the drawings, schematically:

Figure 1A:
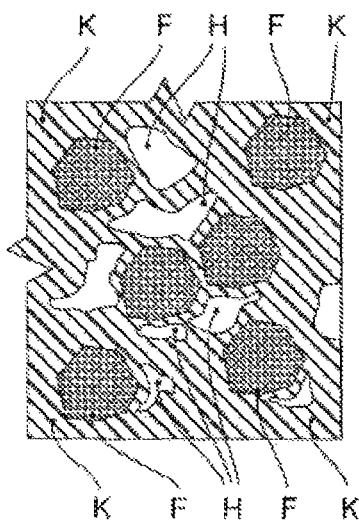
FIG. 1a is part of the cross section of a fibre-reinforced plastics composite after the impregnation.

FIG. 1a schematically shows a cross section through a fibre-reinforced plastics composite material. The part of the cross section shown is so small that only six F are visible. These F are already all fully "impregnated", i.e. their entire outer surface is already wetted with at least one thin layer of the liquefied plastics material K. The spaces between the F are already largely filled with plastics material K and are only interrupted by air-filled cavities H at a few points.

Because the air is under increased pressure due to the processing of the heated material, it expands when cooling, meaning that the structure of the plastics material, which is not yet completely solidified, is damaged and therefore its adhesive strength and tear resistance is reduced.

Figure 1B:
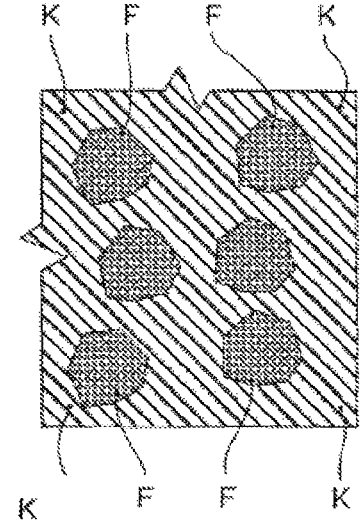
FIG. 1b is a cross section of the fibre-reinforced plastics composite according to FIG. 1a, after additional consolidation.

FIG. 1b shows that the machine according to the invention has driven the cavities H out of the plastics material K by said machine having processed the strip from fibre-reinforced plastics composite material using the profiled bars 3, 4, 5, 6 according to the invention. This process is called consolidation. The ideal state is reached when all the F are surrounded by a homogeneous mass of plastics material K.

Figure 2:
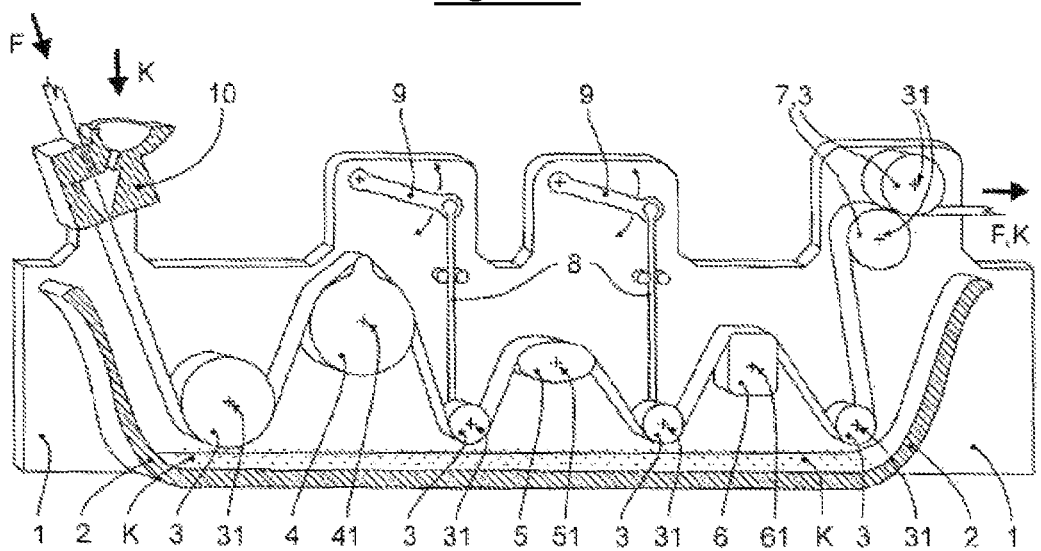
FIG. 2 is a section through the part of a machine for impregnating and consolidating strips of fibre-reinforced plastics composite material.

In FIG. 2, the housing of a machine according to the invention consists of two side walls 1, one of which has been removed in the figure so that the connecting middle part 2 of the housing is visible. At the input of the machine, the strip made of the F first passes through a nozzle 10, which applies plastics material K to all sides of the strip. The coated strip then wraps around a plurality of profiled bars 3, 4, 5, 6. The heating apparatuses which heat and thus liquefy the plastics material K and the heaters for the profiled bars 3, 4, 5, 6 are not shown.

In the variant shown, the middle part 2 of the housing is curved upwards at its ends in the shape of a basin, such that it collects plastics material K that drips off and is not required and drains it away by means of guides (not shown here).

In FIG. 2, the strip first runs around a cylindrical profiled bar 3, which is mounted on the side walls 1 of the machine at the fastening point 31. The relatively large diameter of this profiled bar 3 provides a relatively long path distance of the strip on the cylindrical outer surface. As a result, the plastics material K is evenly distributed on and between the F of the strip.

The strip next runs over a ribbed profiled bar 4. The rib on said profiled bar is visible as a "lug", which is attached to a cylindrical main body. This rib provides a force pulse, which acts on the still viscous plastics material K and between the F in the fibre-reinforced plastics composite and thus drives the cavities H that are still found therein further towards the outside.

The following, elliptical profiled bar 5 exerts two additional force pulses per revolution by means of its two more pointed regions. The polygonal profiled bar 6 generates four pulses by means of its four somewhat rounded corners.

In FIG. 2, it is clear at first glance that, for the profiled bars 4, 5 and 6, the effective diameter fluctuates considerably in relation to the fastening points 41, 51 and 61 over one revolution. As a result, pressure pulses are exerted on the impregnation of the F in a welcome manner.

As a result of this geometry, however, the part of the strip located in the machine would be lengthened or shortened. As a result, additional forces that are not effectively controllable could be exerted on the strip at the adjacent profiled bars, or the strip would briefly lift off from the adjacent profiled bars. In order to prevent these effects, in the configuration of the machine according to the invention as shown in FIG. 2, two cylindrical profiled bars 3 are not directly connected to the side wall 1, but instead are vertically movably mounted. To do this, they are fastened to auxiliary rods 8, which extend as far as the upper edge of the side wall 1 and are articulated to pivotable dancing levers 9 at this point. Only the dancing levers 9 are pivotally connected to the side wall 1. Depending on the relevant angular position of the profiled bars 4, 5 and 6, they raise and lower the two movably mounted profiled bars 3. In this way, they compensate for the geometric changes in length resulting from the non-circular profile of the profiled bars 4, 5 and 6.

FIG. 2 shows an embodiment of a machine according to the invention comprising 7 profiled bars 3, 4, 5, 6, each of which drives further cavities H filled with air out of the plastics material K. Depending on the desired processing speed and the permissible degree of remaining cavities H, configurations comprising up to 100 profiled bars 3, 4, 5, 6 are useful. According to the invention, the ratio of the average contact length of all the profiled bars used in the impregnation in millimetres to the number of profiled bars 3, 4, 5, 6 is between 2 and 1:400, preferably between 1 and 1:200 and particularly preferably between 1:10 and 1:100.

At the end of the machine on the right as shown, the strip is guided upwards out of the basin-shaped middle part 2 of the housing. It then passes through two cylindrical profiled bars 3 arranged very close to one another. The spacing between the outer surfaces of these two profiled bars 3 is less than the thickness of the strip of fibre-reinforced plastics composite material that is then achieved, such that the profiled bars 3 operate as a calender 7. In this way, the plastics material K is compressed for a final time and the strip is brought to the required thickness.

In FIG. 2, the devices of the machine according to the invention for rolling up the strip, for liquefying the plastics material, the heating apparatuses and coolers and also the rollers for the finished strips are not shown because they are well known from the available prior art in many variants.

Figure 3:
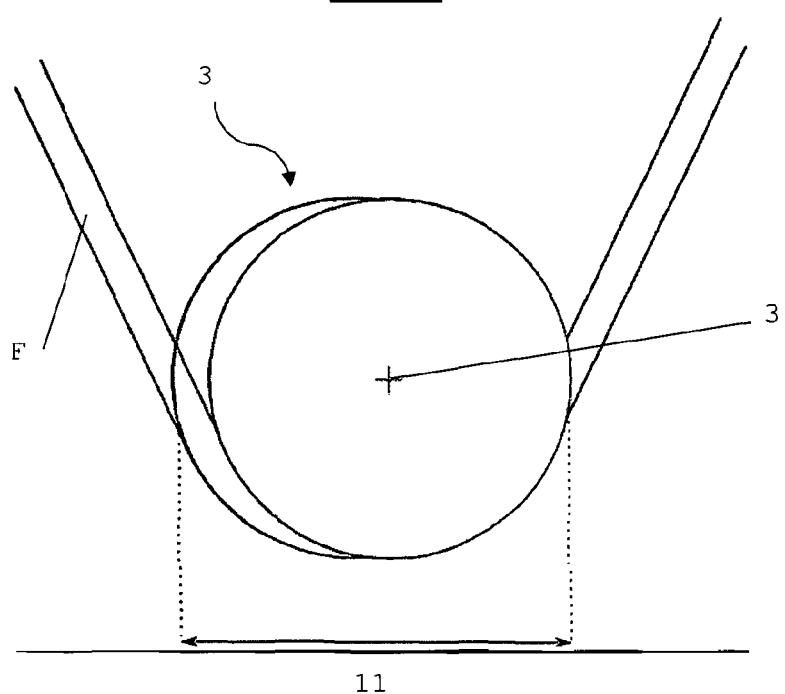
FIG. 3 is detail of the machine for impregnating and consolidating strips of fibre-reinforced plastics composite material from FIG. 2.

FIG. 3 is an enlarged detail of the first profiled bar 3 in the processing direction of the F from FIG. 2. The relatively large diameter of this profiled bar 3 provides a relatively long path distance of the strip on the cylindrical outer surface 11. The sum of the path distances of the strip on all the profiled bars 3, 4, 5, 6 forms the total contact length of the strip with all the profiled bars 3, 4, 5, 6 used during the impregnation. According to the invention, the ratio of the average total contact length of all the profiled bars used in the impregnation in millimetres to the number of profiled bars 3, 4, 5, 6 is between 2 and 1:400, preferably between 1 and 1:200 and particularly preferably between 1:10 and 1:100.

LIST OF REFERENCE SIGNS

F fibres
H cavities in the plastics material K
K plastics material for impregnating the F
1 side wall of the housing of the machine
2 middle part of the housing of the machine
3 profiled bar, cylindrical, mounted between the side walls 1 and 2
31 fastening point or rotational axis of the profiled bar 3
4 profiled bar, ribbed, mounted between the side walls 1 and 2
41 fastening point or rotational axis of the profiled bar 4
5 profiled bar, elliptical, mounted between the side walls 1 and 2
51 fastening point or rotational axis of the profiled bar 5
6 profiled bar, polygonal, mounted between the side walls 1 and 2
61 fastening point or rotational axis of the profiled bar 6
7 profiled bars 3, arranged as a calender
8 auxiliary rods for movably mounting profiled bars 3
9 dancing lever for guiding a profiled bar 3 over the auxiliary rods 8
10 nozzle for applying the plastics material K to the F
11 path distance of the strip on the cylindrical outer surface of the profiled bar

The invention claimed is:

1. A machine for producing strips from a fiber-reinforced plastics composite material, comprising a housing through which fibers pass and in which a plurality of profiled bars are fixedly or rotatably mounted, which are oriented perpendicularly to and/or vertically relative to the passing direction of the fibers and by means of which forces can be applied alternately to the top and bottom of the fibers and to their coating with a plastics material in order to impregnate the fibers and to consolidate the plastics material between the fibers, wherein the ratio of the average total contact length of all the profiled bars used in the impregnation in millimeters to the number of profiled bars is between 2:1 and 1:400, wherein the machine comprises at least 10 profiled bars.

2. The machine according to claim 1, wherein the spacing between the profiled bars in both the vertical and horizontal direction is adjustable.

3. The machine according to claim 1, wherein the spacing between the profiled bars in both the vertical and horizontal direction assumes a different value from one profiled bar to the next.

4. The machine according to claim 1, wherein at least some of the profiled bars have a varying diameter over one revolution.

5. The machine according to claim 1, wherein at least one of the profiled bars has a smaller diameter than the others.

6. The machine according to claim 1, wherein at least one of the profiled bars has a greater diameter than the others.

7. The machine according to claim 1, wherein the spacing between adjacent profiled bars is less than the material thickness of the fibers passing through and their coating with plastics material.

8. The machine according to claim 1, wherein the profiled bars are indirectly or directly heatable individually or in groups.

9. The machine according to claim 1, wherein the machine is designed such that one or more profiled bars are rotatable continuously or discontinuously and in the direction of the fiber movement or counter thereto.

10. The machine according to claim 1, wherein the machine is designed such that a plurality of strips can be produced thereon simultaneously beside one another or above one another.

11. The machine according to claim 10, wherein the machine is designed such that the strips produced beside one another or above one another can be brought together in another consolidation unit to form a vertically or even horizontally layered strip.

12. The machine according to claim 1, wherein the profiled bars comprise milled recesses, which are designed to shape the strip.

13. A method for producing strips from a fiber-reinforced plastics composite material using the machine according to claim 1, wherein additives are added to the plastics material used.

14. The method according to claim 13, wherein further additives for protection or impregnation are applied to the fiber-reinforced plastics composite material during or after processing.

15. The method according to claim 1, wherein the ratio of the average total contact length of all the profiled bars is between 1:1 and 1:200.

16. The method according to claim 1, wherein the ratio of the average total contact length of all the profiled bars is between 1:10 and 1:100.

* * * * *